United States Patent [19]
MacDonald

[11] 3,810,393
[45] May 14, 1974

[54] ANGULAR ACCELEROMETERS

[75] Inventor: William Ronald MacDonald, Hindhead, England

[73] Assignee: National Research Development Corporation, London, England

[22] Filed: Jan. 15, 1973

[21] Appl. No.: 323,699

Related U.S. Application Data
[63] Continuation-in-part of Ser. No. 106,223, Jan. 13, 1971, abandoned.

[30] Foreign Application Priority Data
Jan. 15, 1970  Great Britain..................... 1982/70

[52] U.S. Cl. ............................ 73/505, 73/516 LM
[51] Int. Cl. ........................................... G01p 15/08
[58] Field of Search... 73/505, 515, 516 LM, 517 B, 73/517 A, 398 C, 70.1

[56] References Cited
UNITED STATES PATENTS

| | | | |
|---|---|---|---|
| 2,316,915 | 4/1943 | Truman | 73/517 B X |
| 3,098,393 | 7/1963 | Cook | 73/516 LM |
| 3,131,565 | 5/1964 | Amlie | 73/516 LM |
| 3,276,464 | 10/1966 | Metzger | 73/515 X |
| 3,520,196 | 7/1970 | Morris et al. | 73/516 LM |
| 2,968,947 | 1/1961 | Ainsworth | 73/398 C |
| 3,557,621 | 1/1971 | Ferran | 73/398 C |

FOREIGN PATENTS OR APPLICATIONS
1,263,358  5/1961  France ........................... 73/516 LM Primary Examiner—James J. Gill
Attorney, Agent, or Firm—Cushman, Darby & Cushman

[57] ABSTRACT

An angular motion transducer comprises a rigid sealed gas-tight container, a spiral or toroidal tube mounted within the container and a variable capacitance detecting device connected to the tube, the tube being provided with an opening at some point along its length communicating directly with the interior of the container, and a gas filling the tube and the container, the detecting device being responsive to a mechanical force exerted by the gas in response to angular movement of the transducer. The transducer can act equally well as an angular accelerometer or a torsional vibration transducer provided the natural frequency of the transducer is correctly chosen with respect to the variations to be measured.

9 Claims, 7 Drawing Figures

ANGULAR ACCELEROMETERS

This application is a continuation-in-part of our co-pending, now abandoned parent application Ser. No. 106,223 filed Jan. 13, 1971, in the name of W.R. Mac-Donald and entitled "Angular Accelerometers."

This invention relates to angular motion transducers, and in particular to angular accelerometers or torsional vibration transducers.

It is well known that, in designing any transducer for a particular application, due consideration must be given to the relationship between the natural inherent characteristics of the transducer and the characteristics of the parameter to be measured thereby. For example a transducer having a certain mechanical natural frequency $f_o$ may be used to measure linear accelerations which vary at a frequency well below $f_o$, but the same transducer will also be capable of measuring the amplitude of linear vibrations having a frequency well above $f_o$. Thus the same transducer can be considered as a linear accelerometer or a linear vibration transducer depending upon the application thereof. A particular user will, of course, know which of the two applications of the transducer he wishes to employ and the user will design the components of the transducer in such a way that it has an appropriate natural frequency.

Similarly a transducer designed as an angular accelerometer will equally act as a torsional vibration transducer when subject to angular vibrations at a frequency very much greater than its natural frequency.

Known angular accelerometers employ a rotary mass which must be suitably supported and carefully balanced so as to avoid response to linear accelerations. Furthermore, the mass must have rotary symmetry if it is not to respond to angular velocities which act through axes in a plane perpendicular to the axis of rotation of the mass. To make angular accelerometers of this type to measure small angular accelerations (e.g. of the order of 100 rad/s$^2$ or less) accurately is difficult.

An object of the present invention is to provide an improved angular motion transducer which may be used as an angular accelerometer or a torsional vibration transducer.

According to the present invention an angular motion transducer comprises a rigid sealed gas-tight container, a spiral or toroidal tube mounted within the said container and a variable capacitance detecting device connected to the tube, the said tube being provided wtih an opening at some point along its length which communicates directly with the interior of the container, and a gas filling the tube and the container, the said detecting device being responsive to a mechanical force exerted by the gas in response to angular movement of the transducer.

The variable capacitance detecting device may comprise an annular support, a flexible membrane having an electrically conductive surface and mounted over said annular support, at least one electrode insulatedly mounted and spaced from a face of the said membrane, capacitance-measuring means connected to the said electrode and responsive to variations in the capacitance formed between the said membrane and the said electrode for detecting a deflection of the said membrane due to the said mechanical force.

The variable capacitance detecting device may comprise, for example, two such electrodes insulatedly mounted and spaced from opposite faces of the said membrane, and the capacitance-measuring means may then be connected to the said electrodes and be responsive to variations in the capacitance formed between respectve ones of the said electrodes and the membrane resulting from a difference in pressure or movement between volumes of gas on opposite sides of the membrane in response to angular acceleration or torsional vibration respectively about the axis of the spiral or toroidal tube.

The capacitance-measuring means may be constructed to provide a measurement signal in response to deflections of the membrane caused by torsional vibrations having a frequency greater than the natural frequency of the accelerometer, so that the measurement signal will indicate the amplitude of the torsional vibrations. Alternatively, the capacitance-measuring means may be constructed to provide a measurement signal in response to deflections of the membrane caused by an angular acceleration which is comparatively steady or varies at a rate which is lower than the natural frequency of the accelerometer, so that the measurement signal will indicate the magnitude of the angular acceleration.

If the angular motion transducer is specifically constructed to measure angular accelerations the variable capacitance detecting device may further comprise a balancing circuit connected to the capacitance-measuring means and to the membrane, for applying a voltage thereto to produce an electrostatic force to balance the deflecting effect of the differential pressure thereon. If the variable capacitance detecting device is of the two electrode type described hereinabove, the balancing circuit may comprise supply means connected to the said electrodes for applying a first potential to one and a second potential to the other of the said electrodes; a voltage-switching means, connected to the supply means and the capacitance-measuring means, for producing a signal which is repeatedly switched for the first potential to the second potential with a mark-to-space ratio dependent on an output from the capacitance-measuring means; and smoothing means connected to the voltage-switching means and the membrane, for applying to the membrane the mean potential of the switched signal.

The sensitivity of the angular motion transducer may be enhanced if the gas is a high molecular weight gas and may be further enhanced if the gas is at high pressure.

In both the angular accelerometer and torsional vibration transducer form of the invention a multi-turn spiral or toroidal tube may be used to retain the gas, so as to give greater sensitivity. The difficulties of filling a small spiral or toroidal tube with gas, preferably at high pressure, and sealing it and preventing it from distorting as a result of the internal gas pressure are avoided by putting the whole tube in a rigid container, providing an opening which allows gas in the tube to communicate with gas in the container, filling the whole container with gas, at high pressure if required, and then sealing the container. The mass of gas sealed within the whole transducer is therefore large compared with the mass of gas in the tube alone and therefore small leaks or adsorption of the gas is less critical. Using a gas, which is compressible, in a rigid container maintains the density of the gas substantially constant because it is retained in a substantially constant volume. Because of this the mass of gas within the tube is substantially constant and therefore the response or sensitivity of the transducer is insensitive to temperature variations.

During use as an angular accelerometer the transducer is attached to a body the angular acceleration of which it is desired to measure. As the body is accelerated angularly, a mass of gas suitably contained within the tube is also accelerated, and due to its inertia a pressure differential is developed across the membrane. This pressure differential tends to deflect the membrane. The membrane and each electrode form two capacitors which are connected to opposite arms of a capacitance bridge. The bridge is energised by an alternating voltage signal. A high direct voltage potential difference, of the order of 300 volts, is also applied across the electrodes via coupled inductors which form the ratio arms of the bridge. This ensures that the membrane is situated in a strong electrostatic field. When the membrane is equidistant from each electrode the output of the bridge is zero. When the membrane is deflected, the amplitude of the output of the bridge will vary as the capacitance of the two capacitors vary. The relative phase of the output with respect to the applied alternating signal will indicate the direction of the deflection.

The output of the capacitance bridge is fed to a demodulator via an amplifier. The demodulator produces a direct voltage output which has a magnitude proportional to the amplitude of the output of the bridge and a polarity dependent on the relative phase of the output of the bridge. This direct voltage determines the mark/space ratio of a series of square pulses produced by a high voltage switch which is driven by a Schmidt trigger. These pulses alternate between direct voltage potentials of equal magnitude but opposite polarity, the magnitude being equal to that of the potential applied across the electrodes. The mark/space ratio of the pulses is such that the mean direct voltage level produced by the high voltage switch and applied to the membrane is just sufficient to create an electrostatic pressure between the membrane and electrodes which balances the pressure differential across the membrane. Hence the net deflection of the membrane is almost nil and it is maintained in a central position between the two electrodes. The mean direct voltage applied to the membrane is proportional to the pressure differential between the two pressure chambers which is in turn proportional to the angular acceleration applied to the accelerometer. The mean direct voltage is displayed or recorded by the indicator means which may thus be calibrated to read angular acceleration direct.

An angular accelerometer constructed in accordance with the invention described above need not require calibration since the pressure differential between the two pressure chambers generated by a given angular acceleration may be calculated from a knowledge of the geometry of the container and the density of the particular gas it contains. Furthermore, the sensitivity of the differential pressure transducer may be calculated from a knowledge of the geometry of the electrode arrangement and the high, direct voltage, potential applied across the electrodes.

Because the tube contains a substantially fixed quantity of gas, that is to say the means of the gas in the tube is substantially constant, the sensitivity of the angular accelerometer is independent of temperature. Furthermore the variation of the damping ratio of the accelerometer due to viscosity changes in the gas with temperature is also small.

Such an angular accelerometer can also be constructed so as to be extremely robust and to be able to withstand angular accelerations far greater than its designed upper limit without damage. It responds to angular motion only and does not require balancing.

It was pointed out in the introduction to this specification that a transducer constructed to act as an angular accelerometer will equally well act as a torsional vibration transducer if the angular vibrations to which it is subjected are of sufficiently high frequency with respect to the natural frequency $f_o$ of the transducer, which is given by:

$$f_o = 0.973 \ (r/a^2)(S/\rho Rn) \text{ one-half} \qquad (1)$$

where $r$ is the internal radius of the tube $(m)$, $a$ is the radius of the membrane $(m)$ $S$ is the initial tension in the membrane $(N/m)$, $\rho$ is the density of the gas used $(Kg/m^3)$, $R$ is the mean radius of the rotor tube winding $(m)$, and, $n$ is the number of turns of the rotor tube.

It is important, therefore, when the apparatus described above is required to measure angular accelerations, that the natural frequency $f_o$ of the mechanical system, that is the membrane and the gas in the tube, be high with respect to the expected frequency of the changes of angular acceleration to be measured. Thus the effective restoring force tending to return the membrane to its rest position should be large. Then, when the tube is subject to an angular acceleration the membrane will move the gas with the tube, and the deflection of the membrane will provide a measure of the accelerating force which will be proportional to the acceleration. In general the angular accelerations to be measured will be constant or only slowly varying, so that a deflection nulling method of measurement as hereinbefore described is quite practical. The electrostatic nulling force will usually be much larger than the restoring force due to the stiffness or tension of the membrane and will determine the range of angular accelerations that can be measured.

If the apparatus is required to measure torsional vibrations the membrane should be relatively floppy, and the mass of the gas large so that the natural frequency $f_o$ of the mechanical system will be low. Then, when the tube is subject to a torsional vibration at a frequency higher than $f_o$, the membrane will tend to move so as to allow the gas to remain substantially stationary. In this case, the displacement of the membrane with respect to the tube is a function of the amplitude of the angular vibration. The resulting capacitance changes will therefore follow the variations of the amplitude of the angular vibration, and the output of the demodulator forms an alternating signal the maximum amplitude of which is directly proportional (over a given range of frequencies) to the maximum angle of rotation. This alternating signal can be fed for example directly to an alternating current meter calibrated to read angular vibration amplitude directly. Below a given frequency of angular vibration, corresponding to the mechanical resonant frequency of the system, the device will again be responsive to angular accelerations and not rotations.

Thus the device described above may be constructed for use as an angular accelerometer or as a torsional vibration transducer simply by choosing the effective stiffness of the membrane and the mass of the gas used to give the desired natural frequency response. For clarity the remainder of this specfiction will be directed towards angular accelerometer applications of the apparatus hereinbefore described.

An angular accelerometer constructed in accordance with the invention will now be described by way of example only and with reference to the accompanying diagrammatic drawings of which:

Figure 1:
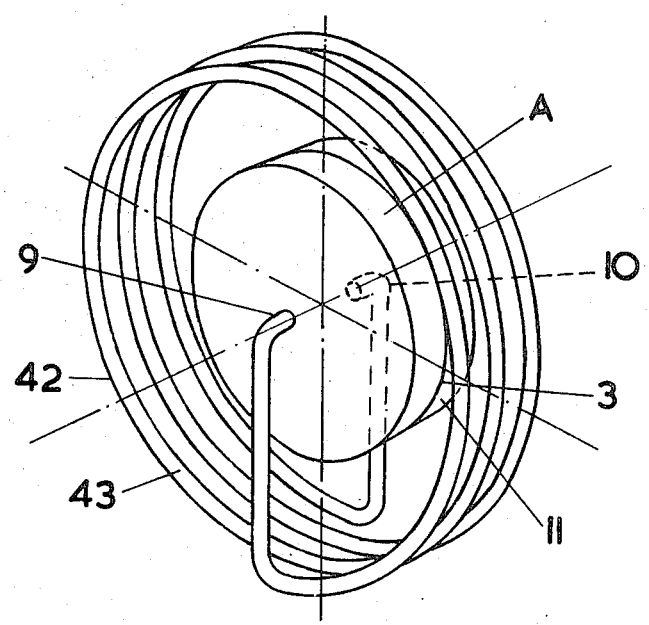
FIG. 1 is a perspective drawing of a rotor/transducer assembly of an angular accelerometer.
Figure 2B:
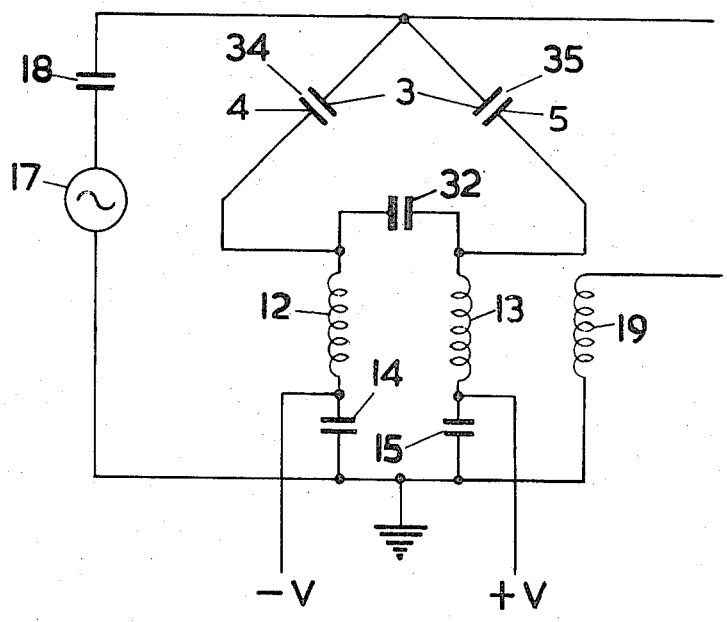
FIG. 2B is a circuit diagram of the equivalent circuit of a capacitance bridge formed in the accelerometer of FIG. 2A.
Figure 2A:
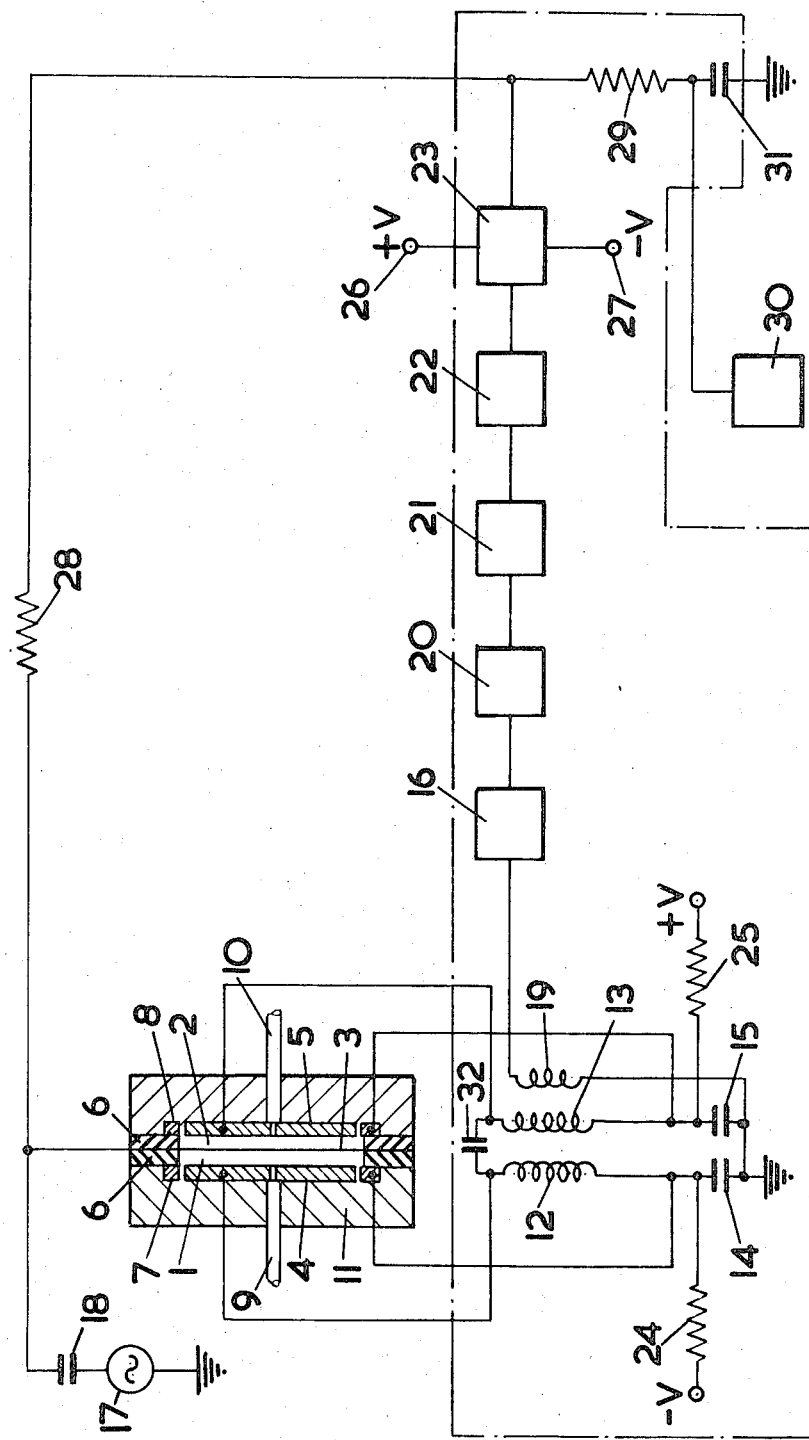
FIG. 2A is a diagrammatic drawing representing a section through the differential pressure transducer in the assembly of FIG. 1 and a schematic block diagram of an electronic circuit connected to it in the angular accelerometer.

FIGS. 1 and 2A show an angular accelerometer which comprises a differential pressure transducer A having two cylindrical pressure chambers 1 and 2 separated by a thin, lightly tensioned, electrically conducting membrane 3 e.g. of metallised Melinex (Registered Trade Mark). Two electrodes 4 and 5 one at each side of the membrane are held equidistant from the membrane by annular spacers 6 of an insulating material and are surrounded by guard rings 7 and 8 respectively. A rotor tube 42 is connected via inlets 9 and 10 to the pressure chambers 1 and 2 respectively, and wound circularly a number of times around a body 11 of the transducer, forming a rotor/transducer assembly. The rotor/transducer assembly is mounted within a rigid sealed outer container with the interior of which the rotor tube 42 can communicate via a hole (not shown) at some point along its length. The rotor tube 42 (not shown in FIG. 1), pressure chamber 9 and 10, and the outer container (not shown) contain air shown at 43. The electrodes 4 and 5 form two air dielectric capacitors with the membrane 3. These two capacitors are shown at 34 and 35 in FIG. 2B respectively, wherein they form two arms of a capacitance bridge. The bridge also includes two coupled inductors 12 and 13 and three further capacitors 14, 15 and 32 connected in the bridge as shown. Inductors 12 and 13 are transformer coupled via an inductor 19 to an amplifier 16. An alternating voltage is applied to the capacitance bridge by an oscillator 17 via a capacitor 18 and the membrane 3. One side of the oscillator 17 is at earth potential as is a junction of capacitors 14 and 15 and inductor 19. The amplifier 16 is connected to a demodulator 20 which also has an input (not shown) from the oscillator 17. The demodulator 20 feeds a saw tooth waveform generator 21 which in turn triggers a Schmidt trigger 22. The Schmidt trigger 22 controls a high voltage switch 23. A high direct voltage potential difference, of the order of 300 volts, is applied to the electrodes 4 and 5 via a resistor 24 and the inductor 12, and, a resistor 25 and the inductor 13 respectively, from a high voltage source, not shown. The same high potential is applied to the high voltage switch 23 via terminals 26 and 27 of said switch. A digital output of the high voltage switch 23 is applied via a resistor 28 to the membrane 3. A resistor 29 and a capacitor 31 smooth the digital output of the high voltage 23 to produce an analogue output which is displayed by an indicator means 30 e.g. a digital voltmeter.

In use, the accelerometer is mounted on a body, the angular acceleration of which it is desired to measure. When the body is stationary or subjected only to linear acceleration or is rotating at constant speed, the pressure exerted by the air on either side of the membrane 3 is the same and the membrane remains equidistant from the two electrodes 4 and 5. Thus the capacitance of the capacitors 34 and 35 formed by the electrodes 4 and 5 with the membrane 3 respectively are equal. If an alternating voltage is applied to the capacitance bridge, by the oscillator 17 via the capacitor 18, when capacitors 34 and 35 are equal, then the output voltage across the inductor 19 will be zero.

As the body is accelerated angularly the inertia of the air 43 within the rotor tube 42 causes a pressure differential to be developed across the membrane 3 tending to deflect it. The resulting deflection causes the capacitance of one of the capacitors 34 and 35 to increase and that of the other to decrease. If the capacitance of the capacitor 34 becomes greater than that of capacitor 35 the alternating voltage output of the bridge may, for instance, be in phase with the applied alternating voltage. If the capacitance of the capacitor 35 becomes greater than that of capacitor 34 then the alternating output voltage of the bridge will be out of phase with the applied alternating voltage. In each case the amplitude of the alternating voltage output of the bridge depends on the magnitude of the deflection of the membrane.

Figure 3A:
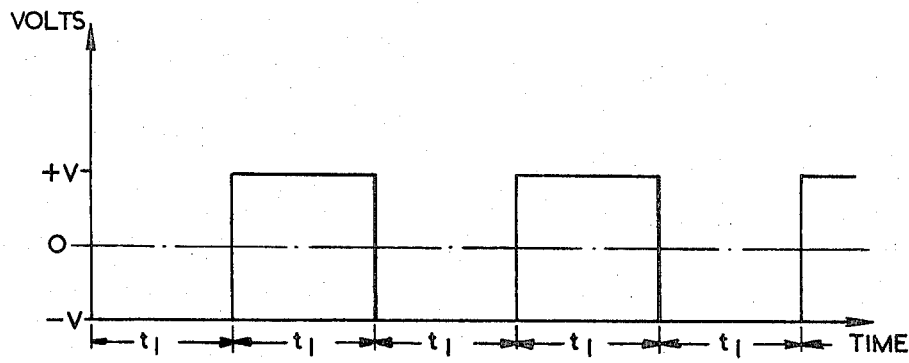
FIGS. 3A, 3B and 3C are graphical diagrams indicating the form of typical pulses produced by the electronic circuit of FIG. 2A when the accelerometer is subjected to various angular accelerations.

The alternating voltage output of the bridge is then fed to an amplifier 16 and then to a demodulator 20 which also has an input from the oscillator 17. The demodulator 20 produces a direct voltage output, the magnitude of which depends on the amplitude of the alternating output of the bridge and the polarity of which depends on the phase of the alternating output of the bridge. This direct voltage is then superimposed as a bias on the output of the saw-tooth waveform generator 21. The amplitude and polarity of the direct voltage from the demodulator determines the time for which the saw-tooth voltage waveform during each saw-tooth cycle is sufficient to trigger a Schmidt trigger 22 to which it is applied. When the capacitances of the capacitors 34 and 35 are equal the mean potential of the saw-tooth voltage waveform is sufficient to trigger the Schmidt trigger 22 for a time during each sawtooth cycle indicated by $t_1$ which is the same as the time for which it is not sufficient. The Schmidt trigger then produces output pulses with equal mark/space ratio as shown in FIG. 3A.

Figure 3B:
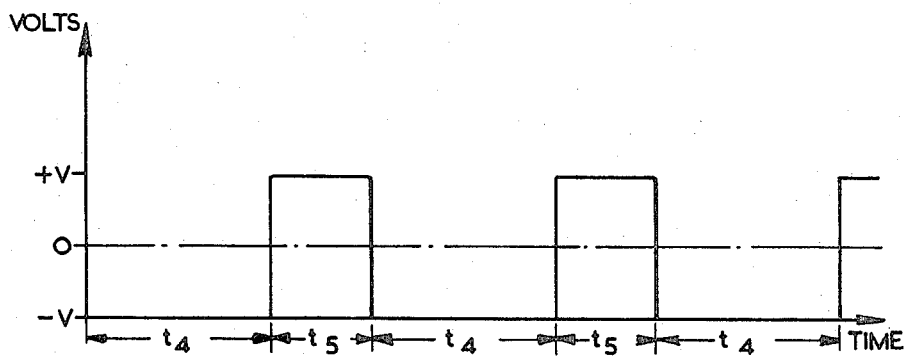

When the capacitances of the capacitors 34 and 35 are unequal and the output alternating voltage from the bridge is e.g. in phase with the applied alternating voltage, the mean potential of the saw-tooth voltage waveform is then sufficient to trigger the Schmidt trigger 22 for a time during each saw-tooth cycle indicated by $t_5$ which is less than the time $t_4$ for which it is not sufficient. Hence the output of the Schmidt trigger 22 is a series of pulses with a mark/space ratio of $t_5:t_4$ as shown in FIG. 3B.

Similarly when the capacitances of the capacitors 34 and 35 are unequal and the alternating voltage output from the bridge is out of phase with the applied alternating voltage the mean potential of the saw-tooth voltage waveform is then sufficient to trigger the Schmidt trigger 22 for a time during each saw-tooth cycle indicated by $t_3$ which is longer than the time $t_2$ for which it is not sufficient. Hence the output of the Schmidt trigger 22 is a series of pulses with a mark/space ratio of $t_3:t_2$ as shown in FIG. 3C.

Each pulse out of the Schmidt trigger 22 operates a high voltage switch 23 which applies a high direct voltage, indicated by V in FIG. 2A, to the membrane 3 via the resistor 28. In the absence of a pulse from the Schmidt trigger 22 an equally high potential V of opposite polarity is applied by the high voltage switch 23 to the membrane 3. The high direct voltage is of the same magnitude as the potential applied to the electrodes 4 and 5 and the mean potential applied to the membrane 3 by the high voltage switch has a polarity the same as the electrode towards which it is deflected. Thus, should the membrane be accidentally deflected so much that it came into close proximity with one or other of the electrodes, the membrane and that electrode would be at the same potential and no damaging arc would occur, and should they make contact no overload current would flow.

Hence, when the capacitors 34 and 35 are of equal capacitance i.e. the membrane is undeflected, a series of pulses of equal mark/space ratio such as is shown in FIG. 3A is produced by the Schmidt trigger 22 and an alternating polarity potential V is applied to the smoothing circuit comprising the resistor 28 and the capacitor 18. Thus the mean voltage level of this alternating potential V is applied to the membrane 3. Since the membrane 3 is in a strong electrostatic field due to the d.c. potential applied to the electrodes 4 and 5, a positive mean voltage level applied to it will deflect it one way and a negative mean voltage level applied to it will deflect it the other way. The frequency of the alternating polarity potential is sufficiently high compared with the mechanical frequency response of the membrane 3 and the response of the smoothing circuit formed by the resistor 28 and the capacitor 18 so that the membrane will not oscillate with the variations of the alternating potential V, but will settle in a position dependent on the mean voltage level.

Figure 3C:
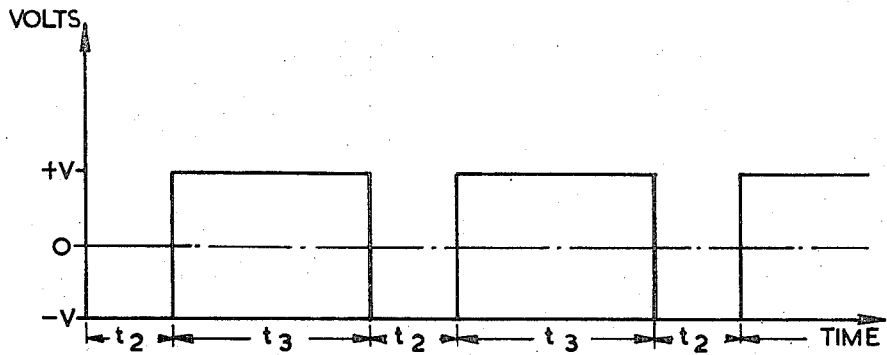

However, when the capacitors 34 and 35 are not of equal capacitance i.e. the membrane 3 has been deflected due to a pressure difference between the two pressure chambers 1 and 2 caused by an angular acceleration, then the series of pulses produced by the Schmidt trigger 22 will have unequal mark/space ratio as show in FIG. 3B or 3C. The mean voltage level output from the smoothing circuit will then be of a magnitude and polarity dependent on the original direction and magnitude of the deflection of the membrane 3. The relationship between the mean voltage level output from the smoothing circuit and the pressure difference between the two pressure chambers 1 and 2 for electrodes spaced equidistant from the membrane is given by $$v = (d^2 P / 2 k_o k_r V) \quad (2)$$

where $v$ is the mean voltage level output (volts)
$p$ is the pressure difference between the two pressure chambers (Newtons per square metre)
$d$ is the distance between each electrode and the membrane (metres)
$k_r$ is the relative dielectric constant of the air
$k_o$ is the dielectric constant of free space (= 8.854 × $10^{-12}$ $F/m$) and 2V is the potential applied across the electrodes (Volts). The distance $d$ between each electrode and the membrane together with the relative dielectric constant of the fluid, $k_r$, may be measured by means of a capacitance bridge. To give a linearly proportional measurement, each electrode is preferably provided with a guard ring, as described, suitably connected to the bridge, such that each ring is held at the same potential as that of the electrode it surrounds. The sensitivity of the differential pressure transducer i.e. the mean potential output for a given pressure difference between the two pressure chambers, can thus be calculated from formula (2) without calibration. If the distances between each electrode and the membrane are unequal, a slightly more complex formula is used. By suitable design of the electronic circuit described, the magnitude and polarity of the mean potential applied to the membrane 3 as a result of any deflection of said membrane, can be made such that it creates an electrostatic pressure between said membrane and the electrodes 4 and 5 which balances the pressure difference and thus retains the membrane 3 almost flat and in a position almost equidistant from said electrodes.

The mean potential from the high voltage switch 23, which is proportional to the magnitude and direction of the angular acceleration imparted to the body, is measured via the resistor 29 by the indicator means 30, e.g. a digital voltmeter, which can thus be calibrated to read angular acceleration direct.

The pressure difference P ($N/m^2$) between the pressure chambers 1 and 2 due to a constant angular acceleration $\alpha$ (radians/$s^2$) is given by:

$$P = \pi/2 \ D^2 \ \rho n \alpha \quad (3)$$

where

D = the mean diameter of the helix $(m)$
$\rho$ = the density of the air 43 ($Kg/m^3$)
and
$n$ = the number of turns of the helix.

Since the tube 42 is closed by the membrane 3 the accelerometer is sensitive to angular accelerations only and is insensitive to linear accelerations. Also, the accelerometer described requires no calibration as its sensitivity i.e. the mean potential output for a given angular acceleration applied to the rotor can be calculated from a consideration of its geometry and a knowledge of the air within the rotor and its density, and the calculated sensitivity of its differential pressure transducer.

The damping rotor h of the accelerometer (or torsional vibration transducer) is given by, $$h = 3.07 \, \zeta(a^2/r^3) \, (R \cdot n/\rho s)\text{one-half} \quad (4)$$

where $\zeta$ is the viscosity of the gas (Nsm$^{-2}$),
$a$ is the radius of the membrane ($m$),
$r$ is the internal radius of the tube ($m$),
$R$ is the mean radius of the rotor tube winding ($m$), $n$ is number of turns of the rotor tube,
$\rho$ is the density of the gas used (in this case air) Kg/$m^3$), and
$S$ is the initial tension in the membrane (N/$m$).

Since the variation of viscosity of a gas with temperature is low and the density of the gas is constant irrespective of temperature because there is a fixed mass of gas in the rotor tube, it will be seen that the variation of damping ratio with temperature is small as stated hereinabove.

Figure 4:
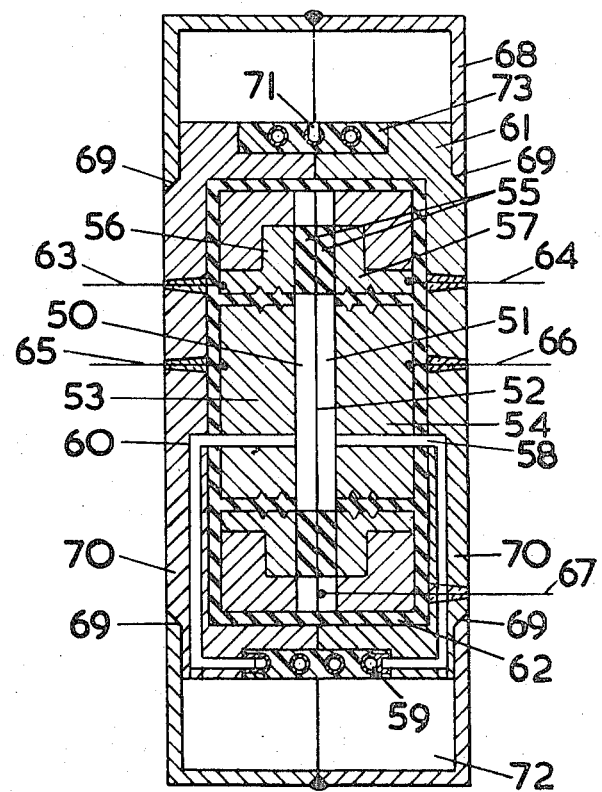
FIG. 4 is a diagrammatic drawing representing a section through a multi-turn rotor/transducer assembly of an angular accelerometer and its casing.

FIG. 4 shows a practical form of angular accelerometer comprising a differential pressure transducer having two cylindrical pressure chambers 50 and 51 separated by a thin, lightly tensioned, electrically conducting membrane 52. Two electrodes 53 and 54, one at each side of the membrane, are surrounded by guard rings 56 and 57 respectively to which they are rigidly joined by means of an insulating adhesive to form two electrode/guard ring assemblies. The electrode/guard ring assemblies are held equidistant from the membrane by annular spacers 55 which are of an insulating material. A rotor tube 59 is connected via inlets 58 and 60 to pressure chambers 51 and 50 respectively and wound circularly a number of times around a body 61 of the transducer and secured to it, in a recess, by means of adhesive 73. The lengths of tubing of the rotor tube 59 connecting the circular windings of that tube to the inlets 58 and 60 of the pressure chambers 51 and 50 respectively are shown at the same radial orientation with respect to the circular windings. The sensitivity of the accelerometer to angular accelerations of the accelerometer about a direction normal to the axis of the tube windings may however be reduced by having these lengths at diametrically opposite radial orientations.

The body 61 of the transducer is constructed in two halves which are clamped together on assembly, each half having a cylindrical raised portion 70 on its outer surface. The body 61 of the transducer is insulated from the electrode/guard ring assemblies by means of an insulating material 62. Electrical connections 63 and 64 to the guard rings 56 and 57 respectively are brought out through the body 61 and insulated from it by means of glass/metal seals. Electrical connections 65, 66 and 67 to the two electrodes 53 and 54 and the membrane 52 respectively are brought out through the body 61 in a similar manner. The electrical connections 63, 64, 65, 66 and 67 may then be further connected to appropriate points on an electrical circuit such as that shown in FIG. 2A. A pressure tight casing 68 is formed in two halves which are welded circumferentially together, and also to the raised portions 70 of the body 61, by welds 69. The rotor tube 59 has an opening 71 in its length, communicating with the annular space 72 enclosed between the casing 68 and the body 61. The opening 71 is preferably at the centre of the rotor tube to minimise air flow through it when it is vibrated. This space 72, the rotor tube 59 and pressure chambers 50 and 51 are filled with a high molecular weight gas, such as ARCTON 13 (Registered Trademark) at a pressure of about four atmospheres. The molecular weight of ARCTON 13 is 104.47.

The operation of the angular accelerometer is identical with that described with reference to the angular accelerometer shown in FIG. 1. However, the angular accelerometer shown in FIG. 4 will have enhanced sensitivity, as will be appreciated from a consideration of equation 3 above, due to the greater density of the ARCTON gas at high pressure compared with the air at atmospheric pressure used in the angular accelerometer of FIG. 1.

The angular accelerometer of FIG. 4 will operate in a wide range of environmental conditions since the boiling point of ARCTON 13 is low.

I claim:

1. An angular motion transducer comprising a rigid sealed gas-tight container, a spiral or toroidal tube mounted within the container, and a variable capacitance differential pressure detecting transducer means connected to ends of the tube, the said tube being provided with an opening at some point along its length which communicates directly with the interior of the container, and a gas filling the tube and the container, the said differential pressure transducer means being responsive to a pressure exerted by the gas in response to angular movement of the transducer.

2. An angular motion transducer as claimed in claim 1 and wherein the variable capacitance differential pressure detecting transducer means comprises an annular support, a flexible membrane having an electrically conductive surface and mounted over said annular support, at least one electrode insulatedly mounted and spaced from a face of the said membrane, capacitance-measuring means connected to the said electrode and responsive to variations in the capacitance formed between the said membrane and the said electrode for detecting a deflection of the said membrane due to the said pressure.

3. An angular motion transducer as claimed in claim 1 and wherein the variable capacitance differential pressure detecting transducer means comprises an annular support, a flexible membrane having an electrically conductive surface and mounted over said annular support, two electrodes insulatedly mounted and spaced from opposite faces of the said membrane, capacitance-measuring means connected to the said electrodes and responsive to differential variations in the capacitances formed between respective ones of the said electrodes and the membrane resulting from a difference in pressure or movement between volumes of gas on opposite sides of the membrane in response to angular acceleration or torsional vibration respectively about the axis of the spiral or toroidal tube.

4. An angular motion transducer as claimed in claim 3 for use as an angular accelerometer and wherein the variable capacitance differential pressure detecting transducer means further comprises balancing circuit means connected to the capacitance-measuring means and to the membrane, for applying a voltage thereto to produce an electrostatic force to balance the deflecting effect of the differential pressure thereon.

5. An angular motion transducer as claimed in claim 4 and wherein the balancing circuit means comprises supply means connected to the said electrodes for applying a first potential to one and a second potential to the other of the said electrodes; a voltage-switching means, connected to the supply means and the capacitance-measuring means, for producing a signal which is repeatedly switched from the first potential to the second potential with a mark-to-space ratio dependent on an output from the capacitance-measuring means; and smoothing means connected to the voltage-switching means and the membrane, for applying to the membrane the mean potential of the switched signal.

6. An angular motion transducer as claimed in claim 1 and wherein the tube substantially comprises an integral number of turns of tubing plus one half turn, wound spirally around the variable capacitance differential pressure detecting transducer means and having ends connected to the differential pressure transducer means by lengths of tubing at diametrically opposed radial orientations with respect to the spiral.

7. An angular motion transducer as claimed in claim 1 and wherein the gas in a gas of molecular weight greater than that of air.

8. An angular motion transducer as claimed in claim 1 and wherein the gas is a gas at a pressure greater than one atmosphere.

9. An angular accelerometer comprising:
a spiral or toroidal tube containing gas and differential pressure transducer means connected to the said tube,
a rigid sealed outer container, filled with gas, within which, the tube and differential transducer means are mounted, and the tube has an opening which allows the gas in the tube to communicate directly with the gas in the container,
an annular support,
a flexible membrane having an electrically conductive surface and mounted over said annular support,
two electrodes insulatedly mounted and spaced from opposite faces of the said membrane,
capacitance-measuring circuit means connected to the said electrodes and responsive to differential variations in the capacitances formed between the said membrane and respective ones of the said electrodes for detecting a deflection of said membrane, and
balancing circuit means connected to the membrane and to an output of the capacitance measuring circuit means, for applying to the membrane a voltage determined by signals at the output of the capacitance measuring circuit means to produce an electrostatic force to balance the deflecting effect on the membrane of a differential pressure developed between volumes of the gas on opposite sides of the membrane in response to angular acceleration about the axis of the spiral or toroidal tube, wherein said balancing circuit means comprises supply means connected to the said electrodes for applying a first potential to one and a second potential to the other of the said electrodes; a voltage-switching means, connected to the supply means and the capacitance-measuring means, for producing a signal which is repeatedly switched from the first potential to the second potential with a mark-to-space ratio dependent on an output from the capacitance-measuring means; and smoothing means connected to the voltage-switching means and the membrane, for applying to the membrane the mean potential of the switched signal.

* * * * *